United States Patent [19]
Padmanaban et al.

[11] Patent Number: 5,852,128
[45] Date of Patent: Dec. 22, 1998

[54] ACID-LABILE GROUP PROTECTED HYDROXYSTYRENE POLYMERS OR COPOLYMERS THEREOF AND THEIR APPLICATION TO RADIATION SENSITIVE MATERIALS

[75] Inventors: Munirathna Padmanaban; Georg Pawlowski; Yoshiaki Kinoshita; Hiroshi Okazaki; Seiya Masuda; Satoru Funato; Tetsu Yamamoto, all of Saitama, Japan

[73] Assignee: Clariant AG, Muttenz, Switzerland

[21] Appl. No.: 922,321

[22] Filed: Sep. 3, 1997

[30] Foreign Application Priority Data

Sep. 10, 1996 [JP] Japan ................................. 8-239141

[51] Int. Cl.⁶ ....................................................... C08F 8/14
[52] U.S. Cl. ...................... 525/328.8; 430/170; 430/176; 430/270.1; 525/385; 525/386
[58] Field of Search ........................ 525/328.8; 430/170, 430/176, 270.1

[56] References Cited

U.S. PATENT DOCUMENTS

| | | | |
|---|---|---|---|
| 3,846,511 | 11/1974 | Hill, Jr. et al. ....................... | 525/328.8 |
| 4,491,628 | 1/1985 | Ito et al. ................................. | 430/176 |
| 4,603,101 | 7/1986 | Crivello ................................. | 430/270 |
| 5,069,997 | 12/1991 | Schwalm et al. ........................ | 430/270 |
| 5,468,589 | 11/1995 | Urano et al. ............................. | 430/170 |
| 5,665,841 | 9/1997 | Kim et al. ............................... | 526/266 |
| 5,736,296 | 4/1998 | Sato et al. ............................ | 430/270.1 |

FOREIGN PATENT DOCUMENTS 0 366 590   5/1990   European Pat. Off. .

OTHER PUBLICATIONS

Ito et al., "Chemical Amplification in the Design of Dry Developing Resist Materials", Polym. Eng. Sci., vol. 23, 1012 (1983).

Crivello et al., "Synthesis, Characterization and Deblocking of Poly(4–tert–Butoxystyrene) and Poly(4–tert–Butoxy–α–Methystyrene)", Poly. Mater. Sci, Eng., 61, 422–426 (1989).

Murata et al., "Positive Deep–UV Resist Based on Silylated Polyhydroxstyrene", J. Photopolym. Sci. Technol., 5, 79–84 (1992).

Hayashi et al., "Tetrahydropyranyl and Tetrahydrofuranyl Protected Polyhydroxystyrenes in Chemical Amplification Resist Systems for KrF Excimer Laser Lithography", Polym. Materi. Sci. Eng., 61, 417–421, (1989).

Mertesdorf et al., "Structural Design of Ketal and Acetal Blocking Groups in 2–Component Chemically Amplified Positive DUV–Resists", Proceedings SPIE, vol. 2438, 84–98 (1995).

Pawlowski et al., "Chemical Amplification & Dissolution Inhibition: A Novel High Performance Positive Tone Deep UV Resist", Photopolym. Sci. & Tech., vol. 5, No. 1, 55–66 (1992).

Primary Examiner—Bernard Lipman
Attorney, Agent, or Firm—Foley & Lardner

[57] ABSTRACT

Acid-labile group protected hydroxystyrene polymers having recurrent pendant groups such as 1-(2-methanecarbonyl oxyethoxy)ethoxy group and 1-(2-N-methylcarbamatoethoxy) ethoxy group. A resist containing the polymer, a photo acid generator, a base, additives and a solvent is sensitive to UV, electron beam and X-ray. In the resist, acid is formed in the exposed area during irradiation, which deprotects acid-labile group catalytically during application of post-exposure baking. Positive patterns are formed after development using an alkaline solution.

8 Claims, No Drawings

ACID-LABILE GROUP PROTECTED HYDROXYSTYRENE POLYMERS OR COPOLYMERS THEREOF AND THEIR APPLICATION TO RADIATION SENSITIVE MATERIALS

BACKGROUND OF THE INVENTION

1. Field of the Invention

The present invention relates to new acid-labile group protected hydroxystyrene polymers or copolymers thereof and their application to a chemically amplified positive working radiation sensitive compositions and resist or copying materials produced therefrom which are sensitive to high energy radiation, especially ultraviolet(UV) radiation in the wavelength range of 150–450 nm, electron beam, and x-ray beam.

2. Description of the Prior Art

The continuous minituarization of the components in the electronic industry is one of the major driving forces for increasing demand of radiation sensitive compositions with improved resolution capability, reliability and performance characteristics. Currently, g-line (456 nm) and i-line (365 nm) light sources together with photoresists made from novolak resins and diazonaphthoquinone(DNQ) dissolution inhibitors are used for producing integrated circuits (ICs) that design rule is above 0.3 μm. Traditional resist materials consisting of novolak/DNQ mixtures are adequate for such applications. Recently, ultra-large scale integration(LSI) requires subquarter micron design rules and it is not possible to use the traditional novolak/DNQ based resist materials and light sources. Among the alternative exposure radiation sources available, deep UV radiation provided by excimer lasers (248 nm) or filtered mercury lamps (240–255 nm) is the most promising candidate for ustra-LSI. Unfortunately, the resist materials based on novolaks absorb too much at these wavelengths and the DNQ sensitizer is too insensitive and hence can not be used for deep UV applications. There is therefore a great demand for resist materials applicable for deep UV.

Chemically amplified resists as described by Ito et al. [H. Ito and C. G. Wilson, Polym. Eng. Sci., Vol. 23, 1012 (1983)], have been known as an alternative resist materials useful for replacing novolak/DNQ systems for deep UV applications. Essentially, such materials consist of a hydroxystyrene polymer wherein part of the phenolic hydroxyl groups are protected with tert-butyloxycarbonyl(t-BOC) groups, and a photoacid generator(PAG) such as triphenylsulfonium hexafluoro antimonate. The acid formed during irradiation in the exposed areas deprotects the tert-butyloxycarbonyl groups catalytically during application of a post-exposure baking(PEB) step at temperatures typically above 50° C. As small amounts of acid formed during irradiation are sufficient to deprotect several t-BOC groups in a catalytic chain reaction, such materials are also called as chemically amplified resists. Because of the catalytic nature of the deprotection reaction, chemically amplified resists satisfy the high sensitivity required for short wavelength radiation.

Following the tert-butyloxycarbonyl groups, a variety of different protecting groups known in organic synthesis has been applied to positive deep UV photoresists. Among these, ethers [J. V. Crivello, D. A. Conlon and J. L. Lee, Polym. Mater. Sci. Eng., 61, 422–426 (1989)], silylethers [M.Murata, E.Kobayashi, Y.Yumoto and T.Miura, J.Photopolym. Sci. Technol. 5, 79–84(1992)], acetals [N.Hayashi, S. S. A.Hesp, T.Ueno, M.Toriumi, T.Iwayanagi, and S.Nonogaki, Polym. Materi. Sci. Eng., 61, 417–421 (1989)] and ketals [C.Mertesdorf, N.Muenzel, H.Holzwarth, P.Falcigno, H. T.Schacht, O.Rohde, R.Schulz., Proceedings SPIE, Vol.2438 (1995)] are the most frequently used phenol blocking groups.

Another way of making chemically amplified resists is simply by blending polyhydroxystyrene(PHS), an acid sensitive dissolution inhibitor such as poly-N-O-acetal and a photoacid generator as recently described by Pawlowski et al. in Photopolym. Sci. & Tech., Vol.5, No.1, 55–66 (1992).

In general the resist materials consisting of polymers with the above mentioned protecting groups suffer from (1) the formation of undesirable standing waves due to interference of reflected radiations upon exposure to short wave length radiation such as deep UV light, and (2) line width variation during storage after exposure or process delays between exposure and post-exposure bake.

SUMMARY OF THE INVENTION

Surprisingly, it has now been founded that resist materials which consist of the acid-labile group protected polymers or copolymers as represented by formula I described below do not show the aforementioned disadvantages. These polymers as well as their application to radiation sensitive resist materials have not been known before.

It is therefore an object of the present invention to provide new acid-labile group protected hydroxystyrene polymers or copolymers thereof which may apply to a chemically amplified positive working radiation sensitive composition.

Another object of the present invention is to provide positive radiation sensitive compositions containing the new acid-labile group protected polymers or copolymers thereof.

Another object of the present invention is to provide resist or copying materials which have high transparency to deep UV light, electron beam and X-ray, and do not produce standing waves due to the interference of reflected light, and undergo no change in dimension of patterns with time.

And further objects of the present invention will be defined from the following description.

The first object of the invention is achieved by new acid-labile group protected hydroxystyrene polymers or copolymers thereof as represented in formula I

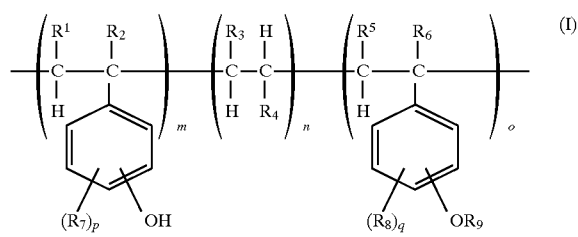

Wherein m and o are independently an integer of 1 or more provided that o/m+o=0.1 to 0.9; and n is zero or an integer of 1 or more, provided that when n is an integer of 1 or more, n/m+n+o=0.05 to 0.5.

$R_1$, $R_2$, $R_5$ and $R_6$ represent independently hydrogen atom or an alkyl group with 1 to 6 carbon atoms, $R_3$ and $R_4$ represent independently hydrogen atom, a cyano group, an alkyl group with 1 to 6 carbon atoms, an aryl group with 6 to 10 carbon atoms, a substituted aryl group or a —$COOR_{10}$ group, or $R_3$ and $R_4$ together form a cyclic group represented by —C(O)OC(O)— or —C(O)$NR_{10}$C(O)—, with $R_{10}$ being hydrogen atom, a linear, branched or cyclic alkyl group with 1 to 6 carbon atoms, an aryl group with 6 to 10 carbon atoms, or an alkaryl group with 7 to 10 carbon atoms, $R_7$ and $R_8$ represent independently hydrogen atom, chlorine atom, bromine atom, an alkyl group with 1 to 6 carbon atoms, or an substituted alkyl group with 1 to 6 carbon atoms, p and q are an integer of 1 to 4 independently, $R_9$ is represented by the formula II

$$—CH(CH_3)OR_{11}OXR_{12} \qquad (II)$$

Wherein $R_{11}$ represents a linear or branched alkylene group with 2 to 6 carbon atoms, X represents a direct bond, or a —C(O)—, —C(O)O—, —S(O$_2$)—, —C(O)NH— or —C(S)NH— group, and $R_{12}$ represents a linear, branched, or cyclic alkyl group with 1 to 6 carbon atoms, a substituted alkyl group with 1 to 6 carbon atoms, an aryl group with 6 to 10 carbon atoms, a substituted aryl group with 6 to 10 carbon atoms, or an alkaryl group with 7 to 10 carbon atoms.

The second object of the present invention is achieved by radiation sensitive compositions consisting of (a) an acid-labile group protected hydroxystyrene polymer or copolymer thereof as represented in formula I, (b) a compound capable of forming an acid upon exposure to actinic radiation, (c) a base or a radiation sensitive base producing neutral compounds upon exposure to actinic radiation for stabilizing the line width of the patterns obtained if necessary, (d) additives to adjust the optical, mechanical and film forming properties if necessary, and (e) a solvent in which components (a), (b), (c) and (d) are dissolved to form a clear solution.

Further, the present invention provides resist or copying materials which comprise above-mentioned radiation sensitive compositions.

In addition, the present invention provides a method for forming a pattern comprising the steps of:
applying the above-mentioned radiation sensitive composition on a substrate; pre-baking the composition for filming; exposing the film selectively to actinic radiation; post-exposure baking of the film; and developing the exposed film to remove the exposed area and form a positive pattern.

PREFERRED EMBODIMENTS OF THE INVENTION

The new acid-labile group protected polymer of the present invention is represented by formula I:

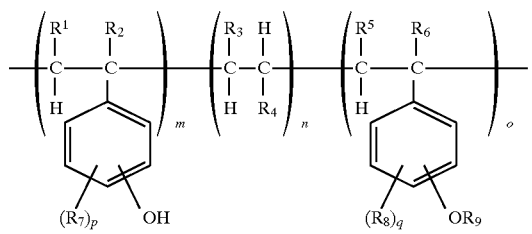

wherein m and o are independently an integer of 1 or more provided that o/m+o=0.1 to 0.9; and n is zero or an integer of 1 or more, provided that when n is an integer of 1 or more, n/m+n+o=0.05 to 0.5.

$R_1, R_2, R_5$ and $R_6$ represent independently hydrogen atom or an alkyl group with 1 to 6 carbon atoms, $R_3$ and $R_4$ represent independently hydrogen atom, a cyano group, an alkyl group with 1 to 6 carbon atoms, an aryl group with 6 to 10 carbon atoms, a substituted aryl group or a —COOR$_{10}$ group, or $R_3$ and $R_4$ together form a cyclic group represented by —C(O)OC(O)— or —C(O)NR$_{10}$C(O)—, with $R_{10}$ being hydrogen atom, a linear, branched or cyclic alkyl group with 1 to 6 carbon atoms, an aryl group with 6 to 10 carbon atoms, or an alkaryl group with 7 to 10 carbon atoms, $R_7$ and $R_8$ represent independently hydrogen atom, chlorine atom, bromine atom, an alkyl group with 1 to 6 carbon atoms, or a substituted alkyl group with 1 to 6 carbon atoms, p and q are an integer of 1 to 4 independently, $R_9$ is represented by formula II

$$—CH(CH_3)OR_{11}OXR_{12} \qquad (II)$$

Wherein $R_{11}$ presents a linear or branched alkylene group with 2 to 6 carbon atoms, X represents a direct bond, or a —C(O)—, —C(O)O—, —S(O$_2$)—, —C(O)NH— or —C(S)NH— group and $R_{12}$ represents a linear, branched, or cyclic alkyl group with 1 to 6 carbon atoms, a substituted alkyl group with 1 to 6 carbon atoms, an aryl group with 6 to 10 carbon atoms, a substituted aryl group with 6 to 10 carbon atoms, or an alkaryl group with 7 to 10 carbon atoms.

Preferred are polymers of formula I, in which m and o are independently an integer of 1 or more provided that o/m+o=0.1 to 0.7; and n is zero or an integer of 1 or more, provided that when n is an integer of 1 or more, n/m+n+o=0.05 to 0.5, $R_1, R_2, R_5$ and $R_6$ represent independently hydrogen atom or an alkyl group with 1 to 3 carbon atoms, $R_3$ and $R_4$ represent independently hydrogen atom, a cyano group, an alkyl group with 1 to 3 carbon atoms, an aryl group with 6 to 10 carbon atoms, a substituted aryl group or a —COOR$_{10}$ group, or $R_3$ and $R_4$ together form a cyclic group represented by —C(O)OC(O)— or —C(O)NR$_{10}$C(O)—, with $R_{10}$ being hydrogen atom, a linear, branched or cyclic alkyl group with 1 to 6 carbon atoms, an aryl group with 6 to 10 carbon atoms, or an alkaryl group with 7 to 10 carbon atoms, $R_7$ and $R_8$ represent independently hydrogen atom, chlorine atom, bromine atom, an alkyl group with 1 to 3 carbon atoms, or a substituted alkyl group with 1 to 6 carbon atoms, $R_9$ is represented by formula II

$$—CH(CH_3)OR_{11}OXR_{12} \qquad (II)$$

Wherein $R_{11}$ represents a linear or branched alkylene group with 2 to 6 carbon atoms, X represents a direct bond, or a —C(O)—, —C(O)O—, —S(O$_2$)—, —C(O)NH— or —C(S) NH— group and $R_{12}$ represents a linear, branched or cyclic alkyl group with 1 to 6 carbon atoms, a substituted alkyl group with 1 to 6 carbon atoms, an aryl group with 6 to 10 carbon atoms, a substituted aryl group with 6 to 10 carbon atoms, or an alkaryl group with 7 to 10 carbon atoms.

Further more preferred are polymers of the formula I, in which m and o are independently an integer of 1 or more provided that o/m+o=0.2 to 0.5; and n is zero or an integer of 1 or more, provided that when n is an integer of 1 or more, n/m+n+o=0.05 to 0.5.

The following polymers are given as examples but the present invention is by no means restricted to these examples:

poly{4-[1-(2-methanecarbonyloxyethoxy)ethoxy]}styrene/4-hydroxystyrene
poly{3-[1-(2-methanecarbonyloxyethoxy)ethoxy]}styrene/3-hydroxystyrene
poly{4-[1-(2-ethanecarbonyloxyethoxy)ethoxy]}styrene/4-hydroxystyrene
poly{4-[1-(2-propanecarbonyloxyethoxy)ethoxy]}styrene/4-hydroxystyrene
poly{4-[1-(2-isopropanecarbonyloxyethoxy)ethoxy]}styrene/4-hydroxystyrene
poly{4-[1-(2-butanecarbonyloxyethoxy)ethoxy]}styrene/4-hydroxystrene
poly{3-[1-(2-methanecarbonyloxyethoxy)ethoxy]}styrene/3-hydroxystyrene/4-methylstyrene
poly{4-[1-(2-ethanecarbonyloxyethoxy)ethoxy]}styrene/4-hydroxystyrene/4-methylstyrene
poly{3-[1-(2-methanecarbonyloxyethoxy)ethoxy]}styrene/3-hydroxystyrene/styrene
poly{4-[1-(2-ethanecarbonyloxyethoxy)ethoxy]}styrene/4-hydroxystyrene/styrene
poly{3-methyl-4-[1-(2-methanecarbonyloxyethoxy)ethoxy]} styrene/3-methyl-4-hydroxystyrene
poly{4-[1-(2-methanesulfonyloxyethoxy)ethoxy]}styrene/4-hydroxystyrene
poly{3-[1-(2-methanesulfonyloxyethoxy)ethoxy]}styrene/3-hydroxystyrene
poly{4-[1-(2-phenylsulfonyloxyethoxy)ethoxy]}styrene/4-hydroxystyrene
poly{4-[1-(2-p-chlorophenylsulfonyloxyethoxy)ethoxy]}styrene/4-hydroxystyrene
poly{3-[1-(2-p-methylphenylsulfonyloxyethoxy)ethoxy]}styrene/4-hydroxystyrene
poly{3-[1-(2-methanesulfonyloxyethoxy)ethoxy]}styrene/3-hydroxystyrene/4-methylstyrene
poly{4-[1-(2-ethanesulfonyloxyethoxy)ethoxy]}styrene/4-hydroxystyrene/4-methylstyrene
poly{3-[1-(2-methanesulfonyloxyethoxy)ethoxy]}styrene/3-hydroxystyrene/styrene
poly{4-[1-(2-ethanesulfonyloxyethoxy)ethoxy]}styrene/4-hydroxystyrene/styrene
poly{3-methyl-4-[1-(2-methanesulfonyloxyethoxy)ethoxy]} styrene/3-methyl-4-hydroxystyrene
poly{4-[1-(2-N-methylcarbamatoethoxy)ethoxy]}styrene/4-hydroxystyrene
poly{3-[1-(2-N-methylcarbamatoethoxy)ethoxy]}styrene/3-hydroxystyrene
poly{4-[1-(2-N-ethylcarbamatoethoxy)ethoxy]}styrene/4-hydroxystyrene
poly{4-[1-(2-N-ethylcarbamatoethoxy)ethoxy]}styrene/4-hydroxystyrene/4-methylstyrene
poly{4-[1-(2-N-ethylcarbamatoethoxy)ethoxy]}styrene/4-hydroxystyrene/styrene
poly{3-methyl-4-[1-(2-N-methylcarbamatoethoxy)ethoxy]} styrene/3-methyl-4-hydroxystyrene
poly{4-[1-(2-N-cyclohexylcarbamatoethoxy)ethoxy]}styrene/4-hydroxystyrene
poly{3-[1-(2-N-cyclohexylcarbamatoethoxy)ethoxy]}styrene/3-hydroxystyrene
poly{4-[1-(2-N-cyclohexylcarbamatoethoxy)ethoxy]}styrene/4-hydroxystyrene/styrene
poly{3-methyl-4-[1-(2-N-cyclohexylcarbamatoethoxy)ethoxy]}styrene/3-methyl-4-hydroxystyrene
poly{4-[1-(2-N-methylthiocarbamatoethoxy)ethoxy]}styrene/4-hydroxystyrene The above-mentioned polymers are especially useful for high resolution IC resist preparation because they yield materials with excellent lithographic properties and adequate thermal flow stability.

The weight average molecular weight of the polymers can vary between 2000 and 200000, preferably between 5000 and 30000 measured on gel permeation chromatography using polystyrene as a standard. The polydispersity of the polymer plays an important role in determining the resist properties and hence need to be controlled. Values of polydispersity between 1 and 3 may be acceptable, but for certain applications this number is desirable to be as close as to 1.

The molar ratio (or degree of protection) of acid-labile groups to free —OH groups also determines the dark erosion of the resist during development as well as the resist properties. The dark erosion should be in a range of between 0 to 150 nm/min., when development is performed with a standard surfactant-free developer containing 2.38% tetramethylammonium hydroxide at 23° C. The required degree of protection is determined by the hydrophilic or hydrophobic nature of the acid-labile group but in general for the polymers mentioned above it could be from 15 to 75 mol %. For example, in poly{4-[1-(2-methanecarbonyloxyethoxy)ethoxy]}styrene/4-hydroxystyrene (Mw=15,000) it is 30 mol %.

The radiation sensitive composition of the present invention comprises of:

a) an acid-labile group protected hydroxystyrene polymer or copolymer thereof represented in the formula I, b) a compound capable of forming an acid upon exposure to actinic radiation, c) a base or a radiation sensitive base producing neutral compounds upon exposure to actinic radiation for stabilizing the line width of the patterns obtained if necessary, d) additives to adjust the optical, mechanical and film forming properties if necessary, and e) a solvent in which components (a), (b), (c) and (d) are dissolved to form clear solution.

Component(a) of the above mentioned composition is any of the compound represented in the formula I. The amount of component(a) in the total mixture is about 10 to 40% by weight, preferably between 15 and 25% by weight.

Component(b) may be any compound capable of generating an acid upon exposure to actinic radiation. The below mentioned compounds are preferred but the list of suitable compounds is by no means exhaustive. Favorable types of compounds useful for photoacid generator include;

(i) bissulfonyl diazomethanes, such as bis (isopropylsulfonyl) diazomethane, bis(tert-butylsulfonyl)diazomethane, bis(sec-butylsulfony) diazomethane, bis(cyclopentylsulfonyl)diazomethane, bis(cyclohexylsulfonyl)diazomethane, cyclohexylsulfonyl ethylsulfonyl diazomethane, cyclohexylsulfonyl tert-butylsulfonyl diazomehtane, methylsulfonyl 4-methylphenylsulfonyl diazomethane, bis (phenylsulfonyl)diazomethane, bis(4-methylphenylsulfonyl)diazomethane, bis(3-methylphenylsulfonyl) diazomethane, bis(4-ethylphenylsulfonyl)diazomethane, bis(2,4- dimethylphenylsulfonyl)diazomethane, bis(4-tert-butylphenylsulfonyl)diazomethane, bis(4-methoxyphenylsulfonyl)diazomethane, bis(4-fluorophenylsulfonyl) diazomethane, bis(4-chlorophenylsulfonyl)diazomethane, bis(4-bromophenylsulfonyl)diazomethane, (ii) bissulfonyl methanes, such as methylsulfonyl 4-phenylsufonyl methane, bis(phenylsulfonyl) methane, bis(4-methylphenylsufonyl)methane, bis(3-methylphenylsulfonyl)methane, bis(4-ethylphenylsufonyl)methane, bis(2,4-dimethylphenylsulfonyl)methane, bis(4-tert-butylphenylsulfonyl)methane, bis(4-methoxyphenylsulfonyl) methane, bis(4-fluorophenylsulfonyl)methane, bis(4-chlorophenylsulfonyl)methane, bis(4-bromophenylsulfonyl)methane, (iii) sulfonylcarbonyl diazomethanes, such as cyclohexylsulfonyl cyclohexylcarbonyl diazomethane, 1-diazo-1-cyclohexylsulfonyl-3,3-dimethyl-2-butanone, 1-diazo-1-(1,1-dimethylethylsulfonyl)-3,3-dimethylbutanone, 1-acethyl-1-(1-methylethylsulfonyl)diazomethane, 1-diazo-1-methylsulfonyl-4-phenyl-2-butanone, 4-methylphenylsulfonyl cyclohexylcarbonyl diazomethane, 1-diazo-1-(4-methylphenylsulfonyl)-3,3-dimethyl-2-butanone, phenylsulfonyl phenylcarbonyl diazomethane, 1-diazo-1-phenylsulfonyl-3,3-dimethyl-2-butanone, 1-diazo-(4-methylphenylsulfonyl)-3-methyl-2-butanone, 2-diazo-2-(4-methylphenylsulfonyl)cyclohexyl acetate, 2-diazo-2-phenylsulfonyl tert-butyl acetate, 2-diazo-2-methylsulfonylisopropyl acetate, 2-diazo-2-phenylsulfonyl tert-butyl acetate, 2-diazo-2-(4-methylphenylsulfonyl)tert-butyl acetate, (iv) sulfonylcarbonyl alkanes, such as 2-methyl-2-(4-methyphenylsulfonyl)propiophenone, 2-cyclohexylcarbonyl-2-(4-methylphenylsulfonyl) propane, 2-methanesulfonyl-2-methyl-4-methylthio propiophenone, 2,4-dimethyl-2-(4-methylphenylsulfonyl)pentane-3-one, (v) nitrobenzyl sulfonates, such as 2-nitrobenzyl p-toluenesulfonate, 2,4-dinitrobenzyl p-toluenesulfonate, 2,6-dinitrobenzyl p-toluenesulfonate, 2,6-dinitrobenzyl p-trifluoromethylphenyl sulfonate, (vi) alkyl and aryl sulfonates, such as pyrogallol trismethane sulfonate, pyrogallol tristrifluoromethane sulfonate, pyrogallol trisphenyl sulfonate, pyrogallol tris-4-methylphenyl sulfonate, pyrogallol tris-4-methoxyphenyl sulfonate, pyrogallol tris-2,4,6-trimethylphenyl sulfonate, pryrogallol trisbenzyl sulfonate, or the related compounds derived from gallic acid esters, brenzcatechol, resorcinol, or hydroquinone, (vii) benzoin sulfonates, such as benzoin tosylate, benzoin mesylate or the like, (viii) N-sulfonyloxyimides, such as N-(trifluoromethylsulfonoxy)phthalimide, N-(4-trifluoromethylbenzenesulfonyloxy)phthalimide, N-(methanesulfonyloxy)phthalimide, N-(ethanesulfonyloxy)phthalimide, N-(benzenesulfonyloxy)phthalimide, N-(toluenesulfonyloxy)phthalimide, N-(pentafluorophenylsulfonyloxy)phthalimide, N-(4-methoxybenzenesulfonyloxy)phthalimide, N-(napthalenesulfonyloxy)phthalimide, N-(camphorsulfonyloxy)phthalimide, N-(camphorsulfonyloxy)naphthalimide, N-(trifluoromethylsulfonyloxy)naphthalimide, N-(pentafluorophenylsulfonyl)naphthalimide, N-(trifluoromethanesulfonyloxy)succinimide, N-(phenylsulfonyloxy)succinimide, N-(methanesulfonyloxy)succinimide, N-(trifluoromethylsulfonyloxy)maleimide, N-(phenylsulfonyloxy)maleimide, N-(methanesulfonyloxy)maleimide, N-trifluorosulfonyloxyphthalimidyl ether, bistrifluoromethyl bis-N,N-trifluoromethylsulfonyloxy phthalimidyl methane, (ix) pyridones, such as (4-fluoro-benzenesulfonyloxy)-3,4,6-trimethyl-2-pyridone, 6-cyclohexyl-1-methanesulfonyloxy-4-methyl-3-nitropyridone, 1-methanesulfonyloxy-3,5-bismethoxymethyl-4,6-dimethyl-2-pyridone, 1-(4-bromo-benzenesulfonyloxy)-4-methyl-6-(4-trifluoromethylstyryl)-2-pyridone, 6-(2-anthracene-9-yl-vinyl)-1-methanesulfonyloxy-4-methyl-2-pyridone, 1-(4-chloro-benzenesulfonyloxy)-4,6-diphenyl-2-pyridone, 6-(4-chlorostyryl)-1-methanesulfonyloxy-4-methyl-2-pyridone, 3-cyano-1-methanesulfonyloxy-4,6-dimethyl-2-pyridone, 4-methyl-6-(2,4,5-trichlorophenyl)-2-pyridone, 1-methanesulfonyloxy-4,6-dimethyl-2-pyridone, 1-benzenesulfonyloxy-6-butyl-4-methyl-5-nitro-2-pyridone, 1-butanesulfonyloxy-4-propyl-6-p-tolyl-2-pridone, 3-bromo-6-(3,4-dichlorophenyl)-4-methyl-1-(toluene-4-sulfonyloxy)-2-pyridone, (x) Sulfonic acid esters, such as 2,2,2-trifluoro-1-trifluoromethyl-1-(3-vinylphenyl)ethyl 4-chlorobenzenesulfonate, 2,2,2-trifluoro-1-p-tolyl-1-trifluoromethylethyl 4-chlorobenzenesulfonate, 2,2,2-trifluoro-1-p-tolyl-1-trifluoromethylethyl 4-(2-phenoxyethoxy)benzenesulfonate, 2,2,2-trifluoro-1-trifluoromethyl-1-(4-vinylphenyl)ethylnaphthalene-2-sulfonate, 2,2,2-trifluoro-1-phenyl-1-trifluoromethylethyl propanesulfonate, 2,2,2-trifluoro-1-trifluoromethyl-1-(3-vinylphenyl)ethyl 4-butoxybenzenesulfonate, 2,2,2-trifluoro-1-p-tolyl-1-trifluoromethylethyl 3,5-dichlorobenzenesulfonate, 1,3-bis(2,2,2-trifluoro-1-methanesulfonyloxy-1-trifluoromethylethyl)benzene, 1,4-bis(2,2,2-trifluoro-1-methanesulfonyloxy-1-trifluoromethylethyl) benzene, (xi) onium salts, such as triphenylsulfonium methane sulfonate, triphenylsulfonium trifluoromethane sulfonate, triphenylsulfonium hexafluoropropane sulfonate, triphenylsulfonium nonafluorobutane sulfonate, triphenylsulfonium phenyl sulfonate, triphenylsulfonium 4-methylphenyl sulfonate, triphenylsulfonium 4-methoxyphenyl sulfonate, triphenylsulfonium 4-chlorophenyl sulfonate, triphenylsulfonium camphorsulfonate, 4-methylphenyl-diphenylsulfonium trifluoromethane sulfonate, bis(4-methylphenyl)-phenylsulfonium trifluoromethane sulfonate, tris-4-methylphenylsulfonium trifluoromethane sulfonate, 4-tert-butylphenyl-diphenylsulfonium tirfluoromethane sulfonate, 4-methoxyphenyl-diphenylsulfonium trifluoromethane sulfonate, mesityl-diphenylsulfonium trifluoromethane sulfonate, 4-chlorophenyldiphenylsulfonium trifluoromethane sulfonate, bis-(4-chlorophenyl)-phenylsulfonium trifluoromethane sulfonate, tris-(4-chlorophenyl) sulfonium trifluoromethane sulfonate, 4-methylphenyldiphenylsulfonium hexafluoropropane sulfonate, bis(4-methylphenyl)-phenylsulfomium hexafluoropropane sulfonate, tris-4-methylphenysulfonium hexafluoropropane sulfonate, 4-tert-butylphenyl-diphenylsulfonium hexafluoropropane sulfonate, 4-methoxyphenyl-diphenylsulfonium hexafluoropropane sulfonate, mesityl-diphenylsulfonium hexafluoropropane sulfonate, 4-chlorophenyl-diphenylsulfonium hexafluoropropane sulfonate, bis-(4-chlorophenyl)-phenylsulfonium hexafluoropropane sulfonate, tris-(4-chlorophenyl)sulfonium hexafluoropropane sulfonate, diphenyliodonium trifluoromethane sulfonate, diphenyliodonium hexafluoropropane sulfonate, diphenyliodonium 4-methylphenyl sulfonate, bis-(4-tert-butylphenyl)iodonium trifluoromethane sulfonate, bis-(4-tert-butylphenyl)iodinium hexafluoropropane sulfonate, bis-(4-cyclohexylphenyl)iodonium trifluoromethane sulfonate, bis-(4-cyclohexylphenyl) iodonium hexafluoropropane sulfonate.

The useful amount of component(b) to obtain a resist with optimum lithographic performance characteristics, such as high resolution, depth of focus and stability is governed by factors, including e.g. the chemical and physical properties of component(a), and e.g. the quantum yield and absorption parameters of component(b). Usually, 0.1 to 10.0% by weight of component(b) with respect to component(a) can be employed and the preferable amount lies between 0.5 and 5.0% by weight. This component(b) can also be a mixture of two or more photoacid generating compounds.

Component(c) is a radiation sensitive base or a standard non-radiation sensitive base. Although component(c) is not particularly necessary to working resist formulations, its addition is preferred to control the critical dimension of the obtained patterns. Especially use of base compounds can control well the properties of pattern obtained e.g. line width, if the intervals between exposure and post exposure baking is prolonged. In addition, a clear contrast enhancement may be observed. Particularly useful radiation sensitive base compounds suitable as the component(c) include, for example, triphenylsulfonium hydroxide, triphenylsulfonium acetate, triphenylsulfonium phenolate, tris-(4-methylphenyl)sulfonium hydroxide, tris-(4-methylphenyl) sulfonium acetate, tris-(4-methylphenyl)sulfonium phenolate, diphenyliodonium hydroxide, diphenyliodonium acetate, diphenyliodonium phenolate, bis-(4-tert-butylphenyl)iodonium hydroxide, bis-(4-tert-butylphenyl) iodonium acetate, bis-(4-tert-butylphenyl)iodonium phenolate, or the like.

Particularly useful normal base compounds as the component(c) include for example
 (i) ammonium salts, such as tetramethylammonium hydroxide, tetrabutylammonium hydroxide,
 (ii) amines, such as n-hexylamine, dodecylamine, aniline, dimethylaniline, diphenylamine, triphenylamine, diazabicyclo octane, diazabicyclo undencane, or
 (iii) basic heterocyclic compounds, such as 3-phenylpyridine, 4-phenylpyridine, lutidine, 2,6-di-tert-butylpyridine, and the like.

The amount of component(c) is determined by the amount and the photoacid generating capabilities of component(b) and varies between 10 to 110 mol % to that of component(b). The most preferable amount of component(c) is between 25 to 95 mol % with respect to compound(b). This component (c) can also be a mixture of two or more base compounds.

In addition the formulation may contain additives denoted as component(d) such as light absorbing agents, dyes, organic carboxylic acids, leveling additives, stabilizing additives, low molecular weight compounds, plasticizing additives, and the like.

The solvent denoted as component(e) should dissolve components(a), (b), (c) and (d) and is not particularly limited as far as the resist material can be used.

Specific examples of the solvent include glycol ethers such as ethylene glycol monomethyl ether, ethylene glycol monoethyl ether, and propylene glycol monomethyl ether, glycol ether acetates such as ethylene glycol monoethyl ether acetate and propylene glycol monomethyl ether acetate (PGMEA), esters such as ethyl lactate, ketones such as acetone, methyl ethyl ketone, cyclopentanone, cyclohexanone or cycloheptanone, and less preferred aromatic hydrocarbons, such as toluene and xylene. In some cases, acetonitrile, dimethylformamide, dioxane, and the like may also be used. These solvents(e) may be used alone or in the form of a mixture of two or more.

The total solid content of the components (a), (b), (c) and (d) may be in the range of from 10 to 50% by weight, preferably in the range of from 15 to 25% by weight with respect to the component(e).

Deep UV which is short-wave UV having wavelengths in the range of from 200 to 300 nm, electron beam, or X-ray generated from suitable exposure sources such as mercury lamps, excimer lasers, electron beam writers, or synchrotrons are preferably used as the actinic radiation for the composition of the present invention. In these, the deep UV is most preferable.

The radiation sensitive composition of the present invention is particularly preferable for resist manufacturing integrated circuits such as ultra-LSI, by reason of being able to form patterns of the level of subquarter micron, and having properties which form no undesirable standing waves based on interference of reflective lights at exposing by short wave length light such as deep UV and show no line width variation during storage after exposure or process delays between exposure and post-exposure bake, and have good resist property. It can be also preferably used as resist for electronic components, resist for thick film integrated circuits, and radiation sensitive coping materials for making lithographic printing plates.

The formation of patterns using the radiation sensitive composition of the present invention can be carried out, for example, by the following method. The composition of the present invention is coated on a substrate, such as a silicon wafer, and baked by heating the coated substrate on a hot plate at 60° to 150° C. for 1 to 3 min to give a uniform film with a film thickness of 300–3000 nm. For special applications thicker or thinner films may be used. A mask for forming a desired pattern is placed between the source of the actinic radiation and the resist film, and the coating is then exposed to deep UV light generated from an KrF excimer laser emitting a wavelength of 248 nm at a dose of about 1 to 100 mJ/cm$^2$. The exposed wafer is then baked between 50° to 150° C. for 1 to 3 minutes on a hot plate followed by development by immersion, spraying or spray-puddle with an alkaline solution such as an aqueous solution containing 2.38% by weight of tetramethylammonium hydroxide for about 1 to 3 minutes. The desired positive resist pattern is thus obtained after development by using the radiation sensitive composition of the present invention.

PREPARATIONS AND EXAMPLES

The following preparations and examples are provided for further illustration of the invention, which, therefore are not intended to limit the scope of the present invention.

Preparation 1

Preparation of 2-methanecarbonyloxyethyl vinyl ether

In a 1 L three neck flask fitted with a thermometer, a dropping funnel and a mechanical stirrer, there was added 1 mol (81.0 g) of ethylene glycol monovinyl ether and 1.05 mol (106.26 g) of triethylamine and 300 mL of tetrahydrofuran(THF). The mixture was cooled to 10°–15° C. using an ice-bath. To the cooled solution, there was added 1.05 mol (84.93 g) of acetyl chloride drop by drop over two hours such that the temperature of the reaction mixture was maintained below 15° C. and the reaction mixture was stirred constantly. After 10 hours of reaction, 500 mL of diethyl ether followed by 500 mL of deionized water was added to the reaction mixture. The organic layer was washed three times with 300 mL of deionized water, and dried using anhydrous magnesium sulfate for 24 hours. The dried organic layer was separated by filtration and diethyl ether was distilled off to obtain the crude product. It was purified by two subsequent distillations under reduced pressure. The compound has a boiling point of 33°–35° C./1 torr, 115°–116° C./20 torr. The yield after purification was 110.7 g (90%). The compound was characterized by IR and NMR. The infrared spectrum shows a strong peak at 1745 cm$^{-1}$ ($\nu_{c=0}$) and the NMR spectra has signals at 2.1 ppm(3H), 3.89 ppm(2H), 4.05 ppm(1H), 4.22 ppm(1H), 4.3 ppm(2H), and 6.25 ppm(1H) confirming that the isolated compound is indeed 2-methanecarbonyloxyethyl vinyl ether.

Preparation 2

Preparation of 2-ethanecarbonyloxyethyl vinyl ether

The same procedure used for Preparation 1 was employed except that the acetyl chloride was replaced with propionyl chloride. The yield was 66%. The product had a boiling point of 45°–50° C./1 torr. It was characterized by IR and NMR.

Preparation 3

Preparation of 2-butanecarbonyloxyethyl vinyl ether

The same procedure used for Preparation 1 was employed except that the acetyl chloride was replaced with pentanoyl chloride. The yield was 85%. The product had a boiling point of 90° C./1 torr. It was characterized by IR and NMR.

Preparation 4

Preparation of 2-methanesulfonyloxyethyl vinyl ether

The same procedure used for Preparation 1 was employed except that the acetyl chloride was replaced with methane sulfonyl chloride. The crude yield was 95%. Attempts to purify the crude product by distillation were unsuccessful, as the product underwent an exothermic degradation reaction when heated. For this reason purification was effected by chromatography on silica gel. The product was characterized by IR and NMR.

Preparation 5

Preparation of 2-benzenesulfonyloxyethyl vinyl ether

The same procedure used for Preparation 1 was employed except that the acetyl chloride was replaced with benzene sulfonyl chloride. The crude yield was 95%. Purification was achieved in the same way as described in Preparation 4. The product was characterized by IR and NMR.

Preparation 6

Preparation of 2-N-ethylcarbamatoethyl vinyl ether

In a 1 L three neck flask fitted with a thermometer, a dropping funnel and a magnetic stirrer, there was added 1 mol (81.0 g) of ethylene glycol monovinyl ether and 0.2 g of triethylamine and 100 mL of tetrahydrofuran(THF). The mixture was cooled to 10°–15° C. using an ice-bath. To the cooled solution, there was added 1 mol (71.08 g) of ethyl isocyanate drop by drop over 1 hour so that the temperature of the reaction mixture was below 25° C. and the reaction mixture was stirred constantly. After completion of the addition of ethyl isocyanate, the reaction mixture was stirred at room temperature(25° C.) for 2 hours and at 70° C. for another 6 hours. The crude product was recovered after distilling off the tetrahydrofuran. It was purified by two time distillation under reduced pressure. The compound had a boiling point of 85° C./1 torr. The yield after purification was 116 g(80%). The compound was characterized by IR and NMR. The infrared spectrum shows a strong peak at 1780 cm$^{-1}$ ($\nu_{c=0}$) and the NMR spectra has signals at 1.17 ppm(3H), 3.25 ppm(2H), 3.87 ppm(2H), 4.02 ppm(2H), 4.29 ppm(2H), and 5.11 ppm(1H), 6.48 ppm(1H) confirming that the isolated compound is indeed 2-N-ethylcarbamatoethyl vinyl ether.

Preparation 7

Preparation of 2-N-methylcarbamatoethyl vinyl ether

The same procedure used for Preparation 6 was employed except that the ethyl isocyanate was replaced with methyl isocyanate. The crude yield was 74%. The boiling point was 79° C./1 torr. It was characterized by IR and NMR.

Preparation 8

Preparation of 2-N-cyclohexylcarbamatoethyl vinyl ether

The same procedure used for Preparation 6 was employed except that the ethyl isocyanate was replaced with cyclohexyl isocyanate. The yield was 66%. The boiling point was 125° C./1 torr and the compound had a melting point of 48° C. It was characterized by IR and NMR.

Preparation 9

Preparation of 2-N-methylthiocarbamatoethyl vinyl ether

The same procedure used for Preparation 6 was employed except that the ethyl isocyanate was replaced with methyl thioisocyanate. The crude yield was 60%. It was characterized by IR and NMR.

Example 1

Preparation of poly{4-[1-(2-methanecarbonyloxyethoxy) ethoxy]}styrene/4-hydroxystyrene 0.25 mol(30 g) of poly(4-hydroxystyrene)(PHS) was taken in a 500 mL three neck flask fitted with a thermometer and a calcium chloride drying tube. It was dissolved in 300 mL of tetrahydrofuran and then 1.25 g (pyridinium p-toluenesulfonate) catalyst and 0.125 mol (0.5 mol equivalent to PHS) of 2-methanecarbonyloxyethyl vinyl ether prepared above Preparation 1 were added. The contents were stirred for 16 hours at 25° C. After stirring, the reacted polymer was isolated by precipitation in 10 L of methanol-water mixture(1:9 v/v). The precipitated polymer was filtered using a G1 glass filter and washed thoroughly with ultra-pure water. The polymer was redissolved in 200 mL acetone and reprecipitated in 10 L of acetone-water mixture (1:9 v/v). The polymer precipitate was filtered in a G1 glass filter and washed with ultra-pure water. It was dried to constant weight at 30° C. under vacuum (1 Torr). The IR spectrum of the polymer showed a peak at 1760 cm$^{-1}$ indicating the presence of reacted methane carbonyl moieties. The polymer was found to have 4-[1-(2-methanecarbonyloxyethoxy)ethoxy] styrene unit and 4-hydroxystyrene unit in a molar ratio of ca. 1:3 based on proton-NMR as well as the weight loss (21.44%) observed on the thermogravimetric analyzer (TGA) between 150° and 350° C. under nitrogen atmosphere at a heating rate of 20° C.

Example 2

Preparation of poly{4-[1-(2-ethanecarbonyloxyethoxy) ethoxy]}styrene/4-hydroxystyrene The same procedure used for Example 1 was employed except that 2-ethanecarbonyloxyethyl vinyl ether (Preparation 2) was used in place of 2-methanecarbonyloxyethyl vinyl ether. The polymer was found to have 4-[1-(2-ethanecarbonyloxyethoxy) ethoxy] styrene unit and 4-hydroxystyrene unit in a molar ratio of ca 1:3 based on proton-NMR as well as the weight loss (23.2%) observed on the thermogravimetric analyzer (TGA) between 150° and 350° C. under nitrogen atmosphere at a heating rate of 20° C.

Example 3

Preparation of poly{4-[1-(2-butanecarbonyloxyethoxy) ethoxy]}styrene/4-hydroxystyrene The same procedure used for Example 1 was employed except that 0.1 mol (0.4 mol equivalent to PHS) of 2-butanecarbonyloxyethyl vinyl ether (Preparation 3) was used in place of 0.125 mol 2-methanecarbonyloxyethyl vinyl ether. The polymer was found to have 4-[1-(2-butanecarbonyloxyethoxy)ethoxy]styrene unit and 4-hydroxystyrene unit in a molar ratio of ca. 1:4 based on proton-NHR as well as the weight loss (22.27%) observed on the thermogravimetric analyzer(TGA) between 150° and 350° C. under nitrogen atmosphere at a heating rate of 20° C.

Example 4

Preparation of poly{4-[1-(2-methanesulfonyloxyethoxy) ethoxy]}styrene/4-hydroxystyrene The same procedure used for Example 1 was employed except that 2-methanesulfonyloxyethyl vinyl ether (Preparation 4) was used in place of 2-methanecarbonyloxyethyl vinyl ether. The IR spectrum of the polymer showed a peak at 1788 cm$^{-1}$ indicating the presence of reacted methane sulfonyl moieties. The polymer was found to have 4-[1-(2-methanesulfonyloxyethoxy) ethoxy]styrene unit and 4-hydroxystyrene unit in a molar ratio of ca. 1:3 based on proton-NMR as well as the weight loss (25.8%) observed on the thermogravimetric analyzer (TGA) between 150° and 350° C. under nitrogen atmosphere at a heating rate of 20° C.

Example 5

Preparation of poly{4-[1-(2-ethanecarbonyloxyethoxy) ethoxy]}styrene/4-hydroxystyrene/4-methylstyrene The same procedure used for Example 1 was employed except that a copolymer of poly(4-hydroxystyrene-co-4-methylstyrene) with a molar ratio of 9:1 4-hydroxystyrene/4-methylstyrene units was used in place of poly(4-hydroxystyrene) and 2-ethanecarbonyloxyethyl vinyl ether (Preparation 2) was used in place of 2-methanecarbonyloxyethyl vinyl ether. The polymer was found to have 4-[1-(2-ethanecarobonyloxyethoxy) ethoxy] styrene unit, 4-hydroxystyrene unit and 4-methylstyrene unit in a molar ratio of ca. 3:6:1 based on proton-NMR as well as the weight loss (26.2%) observed on the thermogravimetric analyzer (TGA) between 150° and 350° C. under nitrogen atmosphere at a heating rate of 20° C.

Example 6

Preparation of poly{4-[1-(2-ethanecarbonyloxyethoxy) ethoxy]}styrene/4-hydroxystyrene/styrene The same procedure used for Example 1 was employed except that a copolymer of poly(4-hydroxystyrene-co-styrene) with a molar ratio of 9:1 4-hydroxystyrene/4-methylstyrene units was used in place of poly(4-hydroxystyrene) and 2-ethanecarbonyloxyethyl vinyl ether (Preparation 2) was used in place of 2-methanecarbonyloxyethyl vinyl ether. The polymer was found to have 4-[1-(2-ethanecarbonyloxyethoxy)ethoxy] styrene unit, 4-hydroxystyrene unit and styrene unit in a molar ratio of ca.1:3:0.4 based on proton-NMR as well as the weight loss (23%) observed on the thermogravimetric analyzer (TGA) between 150° and 350° C. under nitrogen atmosphere at a heating rate of 20° C.

Example 7

Preparation of poly{4-[1-(2-N-methylcarbamatoethoxy) ethoxy]}styrene/4-hydroxystyrene The same procedure used for Example 1 was employed except that 0.175 mol (0.7 mol equivalent to PHS) of 2-N-ethylcarbamatoethyl vinyl ether (Preparation 6) was used in place of 2-methanecarbonyloxyethyl vinyl ether. The polymer was found to have 4-[1-(2-N-methylcarbamatoethoxy)ethoxy]styrene unit and 4-hydroxystyrene unit in a molar ratio of ca. 25:75 based on proton-NMR as well as the weight loss (25%) observed on the thermogravimetric analyzer (TGA) between 150° and 350° C. under nitrogen atmosphere at a heating rate of 20° C.

Example 8

Preparation of poly{4-[1-(2-N-cyclohexylcarbamatoethoxy) ethoxy]}styrene/4-hydroxystyrene The same procedure used for Example 1 was employed except that 0.15 mol (0.5 mol equivalent to PHS) of 2-N-cyclohexylcarbamatoethyl vinyl ether (Preparation 8) was used in place of 2-methanecarbonyloxyethyl vinyl ether. The polymer was found to have 4-[1-(2-N-cyclohexylcarbamatoethoxy)ethoxy]styrene unit and 4-hydroxystyrene unit in a molar ratio of ca. 42:58 based on proton-NMR as well as the weight loss (42%) observed on the thermogravimetric analyzer(TGA) between 150° and 350° C. under nitrogen atmosphere at a heating rate of 20° C.

Example 9

Resist Formulation Example 1

A resist composition was prepared according to the following composition.

| | |
|---|---:|
| Protected polymer of EXAMPLE 1 | 3.401 g |
| Triphenylsulfonium trifluoromethane sulfonate | 0.102 g |
| Propylene glycol monomethyl ether acetate (PGMEA) | 11.8 g |

The mixture was agitated for not less than 1 hour, and the resultant resist solution was filtered through 0.5 and 0.2 µm filters to remove particles. The resist solution thus obtained was spin-coated on a silicon wafer (any semiconductor substrate can be used), and the resultant coating was prebaked at a temperature of 130° C. for 60 seconds. The spinning speed of the coater was adjusted such that a resist film thickness of 0.7 µm was obtained. The resist coated silicon wafer thus obtained was selectively exposed to KrF excimer laser mounted stepper(NA=0.55, σ=0.5) at 248.4 nm through a mask. The exposed wafer was baked on a hot plate at 70° C. for 90 seconds and developed with an alkaline developer (2.38% by weight tetramethylammonium hydroxide) for 60 seconds. As the exposed region was dissolved in the developer, a positive pattern was obtained. The pattern had a wall angle of 90°. The resolution of line and space was 0.20 µm, and the exposure energy was 20 mJ/cm².

Example 10

Resist Formulation Example 2

A resist composition was prepared according to the following composition.

| | |
|---|---:|
| Protected polymer of EXAMPLE 1 | 3.401 g |
| Triphenylsulfonium trifluoromethane sulfonate | 0.102 g |
| 0.1 mmol/g solution of triphenylsulfonium acetate in PGMEA | 1.241 g |
| Propylene glycol monomethyl ether acetate | 11.8 g |

The coating, exposure and development procedures of Example 9 were repeated. The pattern had a wall angle of 90°, the resolution of line and space was 0.20 µm, and the exposure energy was 40 mJ/cm². Compared to Example 9, the line patterns obtained using this formulation was found to be stable dimensionally (width) when a delay time between exposure and post-exposure bake was prolonged up to 2 hours due to the use of triphenylsulfonium acetate photosensitive base.

Example 11

Resist Formulation Example 3

A resist composition was prepared according to the following composition.

| | |
|---|---:|
| Protected polymer of EXAMPLE 2 | 3.405 g |
| Triphenylsulfonium trifluoromethane sulfonate | 0.102 g |
| 0.1 mmol/g solution of triphenylsulfonium acetate in PGMEA | 1.241 g |
| Propylene glycol monomethyl ether acetate | 11.8 g |

The coating, exposure and development procedures of Example 9 were repeated. The pattern had a wall angle of 90°, the resolution of line and space was 0.19 µm, and the exposure energy was 45 mJ/cm².

Example 12

Resist Formulation Example 4

A resist composition was prepared according to the following composition.

| | |
|---|---:|
| Protected polymer of EXAMPLE 3 | 3.405 g |
| Bis(phenylsulfonyl)diazomethane | 0.110 g |
| 0.1 mmol/g solution of triphenylsulfonium acetate in PGMEA | 1.241 g |
| Propylene glycol monomethyl ether acetate | 11.8 g |

The coating, exposure and development procedures of Example 9 were repeated. The pattern had a wall angle of 88°, the resolution of line and space was 0.22 µm, and the exposure energy was 46 mJ/cm².

Example 13

Resist Formulation Example 5

A resist composition was prepared according to the following composition.

| | |
|---|---:|
| Protected polymer of EXAMPLE 4 | 3.405 g |
| triphenylsulfonium 4-methylphenyl sulfonate | 0.120 g |
| 0.1 mmol/g solution of triphenylsulfonium acetate in PGMEA | 1.241 g |
| Propylene glycol monomethyl ether acetate | 11.8 g |

The coating, exposure and development procedures of Example 9 were repeated. The pattern had a wall angle of 88°, the resolution of line and space was 0.21 µm, and the exposure energy was 42 mJ/cm².

Example 14

Resist Formulation Example 6

A resist composition was prepared according to the following composition.

| | |
|---|---:|
| Protected polymer of EXAMPLE 5 | 3.405 g |
| bis(4-tert-butylphenyl)iodonium trifluoromethane sulfonate | 0.13 g |
| 0.1 mmol/g solution of triphenylsulfonium acetate in PGMEA | 1.241 g |
| Propylene glycol monomethyl ether acetate | 11.8 g |

The coating, exposure and development procedures of Example 9 were repeated. The pattern had a wall angle of 90°, the resolution of line and space was 0.20 µm, and the exposure energy was 35 mJ/cm².

Example 15

Resist Formulation Example 7

A resist composition was prepared according to the following composition.

| | |
|---|---:|
| Protected polymer of EXAMPLE 6 | 3.405 g |
| bis(4-tert-butylphenyl)iodonium trifluoromethane sulfonate | 0.13 g |
| 0.1 mmol/g solution of triphenylsulfonium acetate in PGMEA | 1.241 g |
| Propylene glycol monomethyl ether acetate | 11.8 g |

The coating, exposure and development procedures of Example 9 were repeated. The pattern had a wall angle of 90°, the resolution of line and space was 0.20 µm, and the exposure energy was 41 mJ/cm².

Example 16

Resist Formulation Example 8

A resist composition was prepared according to the following composition.

| | |
|---|---|
| Protected polymer of EXAMPLE 7 | 3.405 g |
| 2,4-dinitrobenzyl p-toluene sulfonate | 0.135 g |
| 0.1 mmol/g solution of triphenylsulfonium acetate in PGMEA | 1.241 g |
| Propylene glycol monomethyl ether acetate | 11.8 g |

The coating, exposure and development procedures of Example 9 were repeated. The pattern had a wall angle of 90°, the resolution of line and space was 0.20 μm, and the exposure energy was 41 mJ/cm².

Example 17

Resist Formulation Example 9

A resist composition was prepared according to the following composition.

| | |
|---|---|
| Protected polymer of EXAMPLE 8 | 3.405 g |
| bis(4-tert-butylphenyl)iodonium trifluoromethane sulfonate | 0.13 g |
| 0.1 mmol/g solution of triphenylsulfonium acetate in PGMEA | 1.241 g |
| Propylene glycol monomethyl ether acetate | 11.8 g |

The coating, exposure and development procedures of Example 9 were repeated. The pattern had a wall angle of 90°, the resolution of line and space was 0.21 μm, and the exposure energy was 30 mJ/cm².

The invention has been described in detail with particular reference to preferred embodiments thereof, but it will be understood that variations and modifications can be effected within the spirit and scope of the invention.

We claim:

1. An acid-labile group protected hydroxystyrene polymer or copolymer thereof represented in formula I:

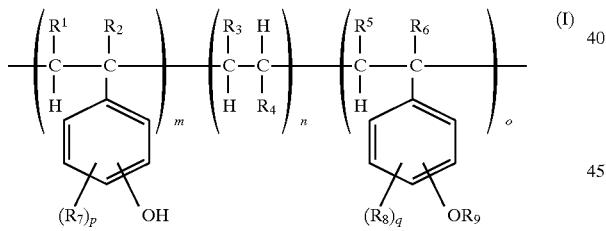

Wherein
 m and o are independently an integer of 1 or more provided that o/m+o=0.1 to 0.9; and n is zero or an integer of 1 or more, provided that when n is an integer of 1 or more, n/m+n+o=0.05 to 0.5,
 $R_1$, $R_2$, $R_5$, and $R_6$ represent independently hydrogen atom or an alkyl group with 1 to 6 carbon atoms,
 $R_3$ and $R_4$ represent independently hydrogen atom, a cyano group, an alkyl group with 1 to 6 carbon atoms, an aryl group with 6 to 10 carbon atoms, a substituted aryl group or a —$COOR_{10}$ group, or $R_3$ and $R_4$ together form a cyclic group represented by —C(O)OC(O)— or —C(O)$NR_{10}$C(O)—, with
 $R_{10}$ being hydrogen atom, a linear, branched or cyclic alkyl group with 1 to 6 carbon atoms, an aryl group with 6 to 10 carbon atoms, or an alkaryl group with 7 to 10 carbon atoms,
 $R_7$ and $R_8$ represent independently hydrogen atom, chlorine atom, bromine atom, an alkyl group with 1 to 6 carbon atoms or a substituted alkyl group with 1 to 6 carbon atoms, p and q are an integer of 1 to 4 independently,
 $R_9$ is represented by the formula II $$-CH(CH_3)OR_{11}OXR_{12} \qquad (II)$$

wherein
 $R_{11}$ represents a linear or branched alkylene group with 2 to 6 carbon atoms,
 X represents a direct bond, or a —C(O)—, —C(O)O—, —S($O_2$)—, —C(O)NH— or —C(S)NH— group, and
 $R_{12}$ represents a linear, branched or cyclic alkyl group with 1 to 6 carbon atoms, a substituted alkyl group with 1 to 6 carbon atoms, an aryl group with 6 to 10 carbon atoms, a substituted aryl group with 6 to 10 carbon atoms, or an alkalyl group with 7 to 10 carbon atoms.

2. An acid-labile group protected hydroxystyrene polymer or copolymer thereof according to claim 1, wherein the polymer or copolymer is selected from the group consisting of
 a) poly{4-[1-(2-methanecarbonyloxyethoxy)ethoxy]} styrene/4-hydroxystyrene,
 b) poly{4-[1-(2-ethanecarbonyloxyethoxy)ethoxy]} styrene/4-hydroxystyrene,
 c) poly{4-[1-(2-butanecarbonyloxyethoxy)ethoxy]} styrene/4-hydroxystyrene,
 d) poly{4-[1-(2-methanesulfonyloxyethoxy)ethoxy]} styrene/4-hydoroxystyrene,
 e) poly{4-[1-(2-ethanecarbonyloxyethoxy)ethoxy]} styrene/4-hydroxystyrene/4-methylstyrene,
 f) poly{4-[1-(2-ethanecarbonyloxyethoxy)ethoxy]} styrene/4-hydroxystyrene/styrene,
 g) poly{4-[1-(2-N-methylcarbamatoethoxy)ethoxy]} styrene/4-hydroxystyrene,
 h) poly{4-[1-(2-N-ethylcarbamatoethoxy)ethoxy]} styrene/4-hydroxystyrene,
 i) poly{4-[1-(2-N-methylthiocarbamatoethoxy)ethoxy]} styrene/4-hydroxystyrene, and
 j) poly{4-[1-(2-N-cyclohexylcarbamatoethoxy)ethoxy]} styrene/4-hydroxystyrene.

3. A radiation sensitive composition comprising of
 (a) an acid-labile group protected hydroxystyrene polymer or copolymer thereof represented in the formula I of claim 1,
 (b) a compound capable of forming an acid upon exposure to actinic radiation,
 (c) a base or a radiation sensitive base producing neutral compounds upon exposure to actinic radiation for stabilizing the line width of the patterns obtained if necessary,
 (d) additives to adjust the optical, mechanical and film forming properties if necessary, and
 (e) a solvent in which components (a), (b), (c) and (d) are dissolved to form clear solution.

4. A radiation sensitive composition according to claim 3, wherein component(a) is an acid-labile group protected polymer or copolymer thereof mentioned in claim 2.

5. A radiation sensitive composition according to claim 3, wherein component(b) is a photoacid generating compound selected from the following photoacid generators and their derivatives bis(cyclohexylsulfonyl)diazomethane
bis(tert-butylsulfonyl)diazomethane
bis(4-methylphenylsulfonyl)diazomethane
bis(phenylsulfonyl)diazomethane
bis(4-chlorophenylsulfonyl)diazomethane
triphenylsulfonium trifluoromethanesulfonate
phenylsulfonyl phenylcarbonyl diazomethane
triphenylsulfonium hexafluoropropanesulfonate
triphenylsulfonium 4-methylphenylsulfonate
triphenylsulfonium camphorsulfonate
diphenyliodinium trifluoromethnesulfonate
bis(4-tert-butylphenyl)iodonium trifluoromethane-
  sulfonate
bis(4-tert-butylphenyl)iodonium hexafluoropropane-
  sulfonate
pyrogallol tristrifluoromethanesulfonate
pyrogallol trisphenylsulfonate.

6. A radiation sensitive composition according to claim 3, wherein the component(c) is a radiation sensitive base or standard non-radiation sensitive base.

7. A radiation sensitive composition according to claim 3, wherein the solvent(e) is propylene glycol monomethyl ether acetate.

8. A radiation sensitive resist material consisting of a radiation sensitive composition mentioned in claim 3.

\* \* \* \* \*